United States Patent [19]

Toy et al.

[11] Patent Number: 4,630,260
[45] Date of Patent: Dec. 16, 1986

[54] SELF-ROUTING MULTIPATH PACKET SWITCHING NETWORK WITH SEQUENTIAL DELIVERY OF PACKETS

[75] Inventors: Wing N. Toy, Glen Ellyn; Avinash K. Vaidya, Naperville, both of Ill.

[73] Assignee: AT&T Bell Laboratories, Murray Hill, N.J.

[21] Appl. No.: 749,567

[22] Filed: Jun. 27, 1985

[51] Int. Cl.[4] .......................... H04Q 11/04; H04J 3/24
[52] U.S. Cl. .......................................... 370/60; 370/94
[58] Field of Search .............................. 370/60, 94, 58

[56] References Cited

U.S. PATENT DOCUMENTS

| | | | |
|---|---|---|---|
| 4,320,500 | 3/1982 | Barberis et al. | 370/60 |
| 4,475,192 | 10/1984 | Fernow et al. | 370/60 |
| 4,484,326 | 11/1984 | Turner | 370/60 |
| 4,512,011 | 4/1985 | Turner et al. | 370/60 |

FOREIGN PATENT DOCUMENTS 58-150349  9/1983  Japan.

OTHER PUBLICATIONS

*IEEE Transactions on Computers*, vol. C-28, No. 10, Oct. 1979, New York (U.S.) A. Hopper, et al., "Binary Routing Networks", pp. 669-703.
*International Switching Symposium*, Montreal, Sep. 21-25, 1981, IEEE (New York, U.S.) G. R. D. Alles, et al., "An Experimental Digital Switch for Data and Voice", Session 21B, paper 3, pp. 1-7.
*International Switching Symposium*, Montreal, Sep. 21-25, 1981, IEEE (New York, U.S.) N. Corsi, et al., "Design and Performance of Subscriber Access Equipment for Packet Switched Networks", Session 32C, paper 4, pp. 1-7.
*IEEE Transactions on Computers*, vol. C-31, No. 5, May, 1982, New York (U.S.) G. B. Adams, III, et al., "The Extra Stage Cube: A Fault-Tolerant Interconnection Network for Supersystems", pp. 443-454.
*Proc. of the Sixth International Conf. on Computer Communication*, London, Sep. 7-10, 1982, North-Holland Pub. Co. (Amsterdam, NL) M. Romagnoli, et al., "ISDN Capabilities in a Digital Local Exchange", pp. 37-42.

Primary Examiner—Douglas W. Olms
Assistant Examiner—Wellington Chin
Attorney, Agent, or Firm—John C. Moran

[57] ABSTRACT

A communication method and packet switching network in which self-routing packets are communicated via multipaths through the network while maintaining the sequence of the packets. The switching network has a plurality of stages and the stages are interconnected by inter-node links. Each inter-node link comprises a pair of sublinks thus establishing multipaths through the switching network in response to the self-routing packets. Each stage has a plurality of switch nodes. A switch node is responsive to packets received on one inter-node like destined for a second inter-node link to maintain the sequence of packets as they are communicated out on the second inter-node link. Each node comprises a plurality of input circuits each individually connected to one of the incoming sublinks and a plurality of output circuits each connected to one of the outgoing inter-node links. Each output circuit has an arbiter which properly sequences the packets onto the outgoing link in response to requests for communicating packets received from the input circuits.

17 Claims, 10 Drawing Figures

| START BIT | PACKET LENGTH | DEST TRUNK CNTRLR | SOURCE TRUNK CNTRLR | CONTROL | ARRIVAL TIME | PACKET IDENTIFIER | LOGICAL ADDRESS | TIME STAMP | DATA | CRC |
|---|---|---|---|---|---|---|---|---|---|---|
| • | | 10111 | 60 | 0 | | 1 | | 2 | | |

FIG. 4

| START BIT | PACKET LENGTH | DEST TRUNK CNTRLR | SOURCE TRUNK CNTRLR | CONTROL | ARRIVAL TIME | PACKET IDENTIFIER | LOGICAL ADDRESS | TIME STAMP | DATA | CRC |
|---|---|---|---|---|---|---|---|---|---|---|
| • | | 01111 | 60 | 0 | | 1 | | 2 | | |

FIG. 5

| START BIT | PACKET LENGTH | DEST TRUNK CNTRLR | SOURCE TRUNK CNTRLR | CONTROL | ARRIVAL TIME | PACKET IDENTIFIER | LOGICAL ADDRESS | TIME STAMP | DATA | CRC |
|---|---|---|---|---|---|---|---|---|---|---|
| • | | 11110 | 60 | 0 | | 1 | | 2 | | |

SELF-ROUTING MULTIPATH PACKET SWITCHING NETWORK WITH SEQUENTIAL DELIVERY OF PACKETS

TECHNICAL FIELD

This invention relates to a method and packet switching architecture for the packet switching of voice and data signals. The invention specifically pertains to a packet switching architecture that facilitates the transmission of packets from an originating port via plural or multiple, variable paths through the network for reception at a destination port in the same sequence as received by the originating port.

BACKGROUND OF THE INVENTION

Self-routing packet switching networks such as those using banyan switching nodes communicate packets on the basis of address information contained within the packets. One such switching network is disclosed in the patent of J. S. Turner, "Fast Packet Switching System", U.S. Pat. No. 4,494,230. In the system disclosed in Turner, there is only one unique route between each input and output parity network. An advantage of the existence of only one unique route between a given input and output port of the network is that as the packets are being transmitted from the input port to the output port, it is not possible for the packets to get out of sequence. However, disadvantage of the existence of only one unique path is that temporary traffic conditions can occur where the traffic becomes extremely heavy at one particular point in the network causing delay in the communication of packets through the network. Another problem with the existence of only one unique path is that if a switch node fails within one stage, it affects a number of routes through the switching network.

One known method for alleviating the reliability and traffic congestion problems in a self-routing network is discussed in the report entitled, "Development of a Voice Funnel System", Bolt, Beranek, and Newman, Inc., Report No. 4098, August, 1979, pp. III-29 through III-76, which discloses the use of an extra stage of banyan switching nodes at the input of a self-routing network in an attempt to resolve the previously mentioned problems. The report proposes that this extra stage of switching be identical to other stages of the network and be utilized by adding an extra bit of addressing to the address field of each packet being routed through the switching network. This extra stage of switching would precede the first stage of the network. The extra address bit would be controlled by hardware or software external to the switching network and would determine the route through the switching network. The problem with this switching architecture is that if an earlier packet in a sequence becomes delayed on one route, the later packets of the sequence can arrive at the destination before the delayed packet since the later packets are traveling on the second route through the network.

Another known method for alleviating the reliability and traffic problems in self-routing networks is discussed in the U.S. Pat. No. 4,512,011 of J. S. Turner. In that Turner patent, packets are received by a packet switching system via a plurality of incoming trunks and delivered from the packet switching system by a plurality of trunks that are terminated by trunk controllers. Each switching system has a switching network consisting of two independent switching arrays each capable of routing a packet from an originating trunk controller to a destination trunk controller. Within a given array there is only one unique path between a given originating trunk controller and a given destination trunk controller. When a trunk controller receives a packet from a trunk, the trunk controller routes packets through the arrays by alternating between the arrays if both arrays are idle or choosing the idle array if one of the arrays is busy. Since in that Turner patent, each array consists of a plurality of stages each having a number of switch nodes with the switch nodes having internal buffering capacity for storing one packet, packets being transferred from the trunk controller can arrive out of sequence due to the fact that an earlier packet was delayed through one switching array while a later packet was communicated more quickly through the other array.

Still another method for resolving the reliability and traffic problems in a self-routing network is disclosed in the application of J. S. Turner and L. F. Wyatt, U.S. Pat. No. 4,550,397 and assigned to the same assignee as this application. That application discloses a switching network that consists of routing stages and alternating stages in order to create multiple paths between any destination and originating trunk controller on the switching network. The routing stages are made up of switch nodes that are responsive to the address contained in a packet to communicate the packet to the switch node in the downstream stage designated by the address. The alternating stages comprise switch nodes that, upon receipt of a packet, alternate between communicating that packet to one of two switch nodes in the downstream stage. By interdispersing a number of alternating stages with routing stages in the first stages of the switching networks any number of multiple paths can be created through the switching network. After these initial inter-disperse stages, there are a sufficient number of routing stages to route the packet to the proper destination trunk controller. Both the alternating and routing switch nodes have the capability for buffering one packet internally. Because of the existence of multiple paths and the ability of switch nodes to buffer along these paths, packets transmitted from an originating trunk controller to a destination trunk controller can get out of sequence.

The limitation on known multipath, self-routing networks that packets traversing along different paths within the switching network can get out of order is of particular concern with respect to voice and video applications. In voice applications, the voice is normally digitized by an encoder at a low bit rate and then packetized. This results in an elapse of time from when the words are first spoken until the voice packet is transmitted. If the voice packets get out of sequence, there is not sufficient time to resequence the packets for playback before an unacceptable amount of delay has occurred from when the words were spoken until they are heard by a listener. The same is also true of applications where video information is being transmitted. A TV picture cannot be momentarily blanked out while packets are resequenced. A problem exists even with packets containing only data since the resequencing operation involves extensive use of processor and memory cycles and is not desirable.

In light of the foregoing, it is apparent that a need exists for a packet switching system having multiple paths and, yet, capable of delivering packets in sequence.

SUMMARY OF THE INVENTION

The foregoing problems are solved and a technical advance is achieved in accordance with the principles of this invention incorporated in an illustrative method and switching network architecture that has a plurality of switch nodes each having a plurality of paths to each interconnected, downstream switch node and that delivers packets from an originating network port to a destination network port in the same sequence as received by the originating port by each switch node having a circuit associated with each downstream node that assures the packet sequence.

The structural embodiment comprises a multistage packet switching network having a plurality of stages, each comprising a plurality of switch nodes with the stages being connected by inter-stage links. Each of the inter-stage links has a plurality of sublinks with each sublink being capable of transferring packets between the stages. Each packet contains routing information defining the route through the switching network. A switch node has a circuit responsive to a first packet received from an upstream link for communicating the packet to the downstream stage via one of the sublinks of the downstream link designated by the routing information within the packet. The switch node further comprises another circuit responsive to a later or second packet received from the same upstream link whose routing information also defines the same downstream link as the previous packet for transferring the later one of the packets on one of the sublinks of the downstream link so that the first packet arrives at the downstream node before the later second packet.

Advantageously, the node has a number of input circuits each terminating one of the incoming sublinks connected to the switch node and a number of output circuits each terminating one of the downstream links connected to the switch node. The input and output circuits are interconnected via intra-links. Each output circuit has an arbiter circuit that is connected to each of the input circuits via an intra-link. When an input circuit receives a packet, it transmits a request signal to the arbiter of the output circuit whose connected downstream link is designated by the routing information in the packet requesting the communication of the packet on the downstream link. Another input circuit is responsive to a later packet for transmitting a second request signal to the arbiter circuit requesting the transfer of the later one of the packets on the same downstream link. The arbiter circuit is responsive to the request signals for communicating the packets to the downstream link so that first packet is communicated before the later packet on the downstream link. The arbiter circuit performs the sequencing of these packets on the downstream link through the transmission of grant signals to the requesting input circuits.

In addition to the arbiter circuit, each output circuit has output interface circuits that connect to the sublinks of the downstream link. The arbiter circuit is responsive to the first request signal for relaying this first request signal to the output interface circuit, but is responsive to the second request signal resulting from the later packet for delaying the relaying of this request signal to the output interface circuit until the output interface circuit responds with a grant signal to the first request signal. The disabling of the relaying of the second request signal is performed by a flip-flop which is set in response to the first request signal. As long as the flip-flop is set and a grant signal is not transmitted by the output interface, the second request signal is delayed.

The illustrative method functions with a switching network having a plurality of stages each having a plurality of switch nodes. The stages are interconnected by inter-stage links each having a plurality of sublinks. The method includes the steps of communicating one of the packets received from an upstream link to a downstream stage via a sublink of the downstream link designated by the address routing information contained within the packet and sequencing a later or second one of the packets that was received on the same upstream link via the same downstream link to the downstream node upon the routing information of the latter one designating the same downstream link so that the first packet arrives before the latter packet.

BRIEF DESCRIPTION OF THE DRAWING

In general, system elements, when first introduced on a figure, are each designated with a number which uses the figure number as the most significant digits of the element number.

DETAILED DESCRIPTION

Figure 1:
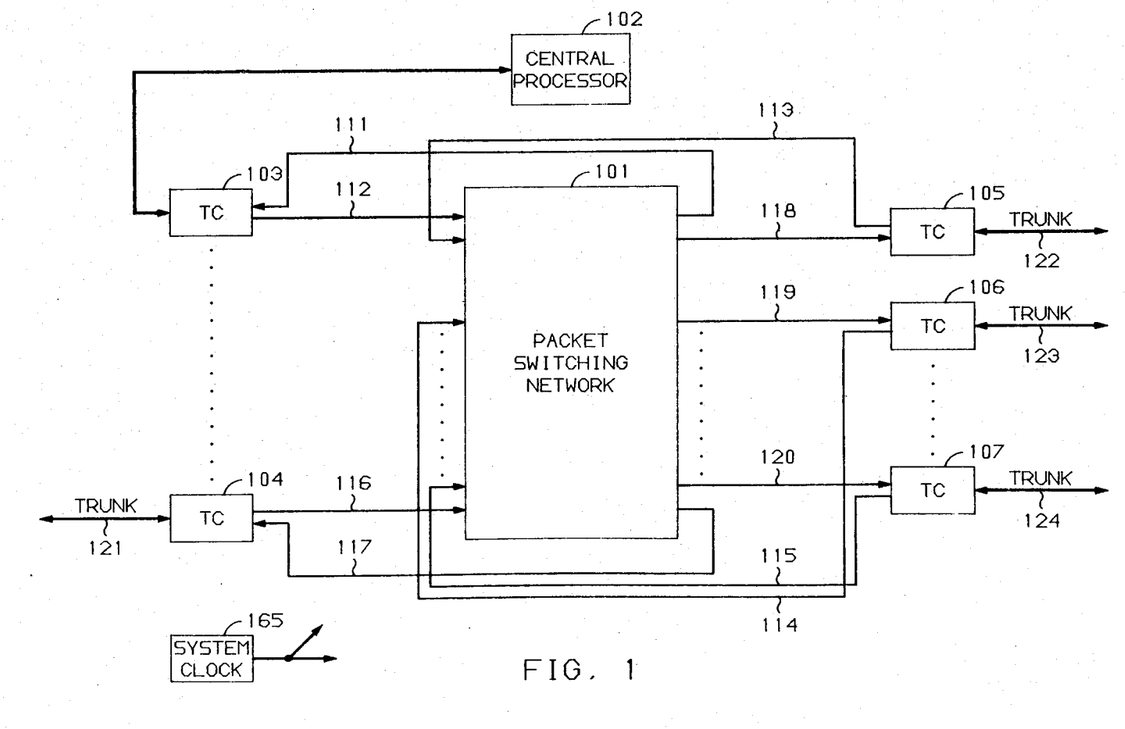
FIG. 1. illustrates, in block diagram form, a packet switching system utilizing the switching architecture of the present invention with the latter depicted in heavy line block diagram form.

FIG. 1 illustrates a packet switching system for switching packets from an originating trunk controller such as trunk controller 104 to a destination trunk controller, such as trunk controller 107. There exists a plurality of paths within switching network 101 that can be utilized in communicating packets from a given originating trunk controller to a destination trunk controller. Packet switching network 101 comprises a plurality of switching stages which, illustratively, may be four, and each switching stage comprises a plurality of switch nodes. Packet switching network 101 is illustrated in greater detail in FIG. 2. An illustrative packet is shown in FIG. 3, which contains in its destination trunk controller field the routing information required to route the packet through packet switching network 101.

Figure 2:
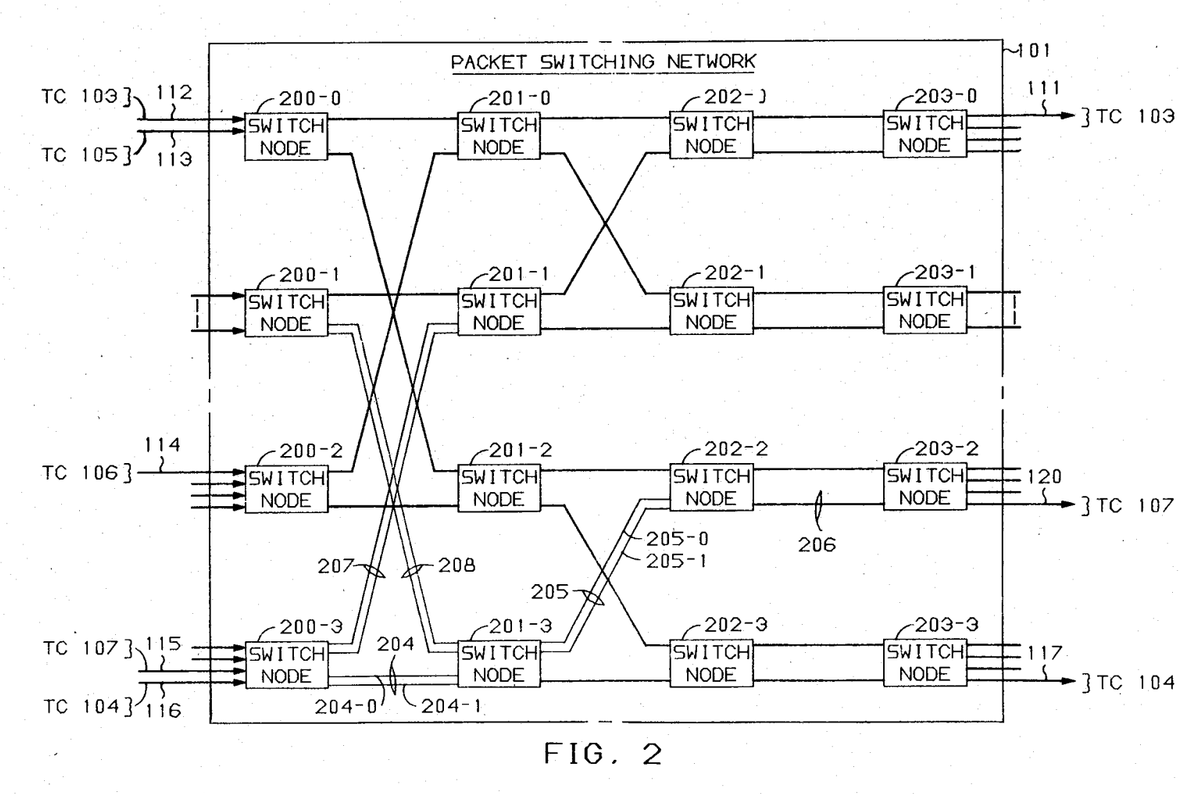
FIG. 2 is a detailed block diagram of switching network 101 of FIG. 1.

Switching network 101, as illustrated in FIG. 2, has four stages: stage 0 comprises switch nodes 200-0 through 200-3, stage 1 comprises switch nodes 201-0 through 201-3, stage 2 comprises switch nodes 202-0 through 202-3 and stage 3 comprises switch nodes 203-0 through 203-3. The switch nodes in stage 0, stage 1, and stage 2, are identical in design; whereas, the switch nodes in stage 3 are of a different design that is described in detail in U.S. Pat. No. 4,494,230, which was previously discussed in the Background of the Invention section. Each node in the first three stages is responsive to a packet received on an input link to communicate this packet via the outgoing link designated by the most significant bit of the destination trunk controller field of the packet. Each link consists of two sublinks thus providing multipath capability through the network. Each switch node is responsive to packets received on a particular input link and that are designated to be communicated on a given outgoing link to assure that the sequence of these packets does not become corrupted due to delay operations internal to the switch node or upon the two sublinks.

The following example will illustrate the functions performed by the switch node to maintain the sequence of the packets. Switch node 200-3 is responsive to the packet illustrated in FIG. 3 to communicate this packet via link 204 to switch node 201-3. Switch node 200-3 selects from link 204 for this operation the idle one of sublinks 204-0 or 204-1. Since there is only one input from trunk controller 104 to switch node 200-3, there is no possibility of packets getting out of sequence during their transfer from trunk controller 104 to switch node 200-3. Before transferring the packet illustrated in FIG. 3 to switch node 201-3, switch node 200-3 performs a left rotation by 1 bit of the destination trunk controller field resulting in the packet illustrated in FIG. 4.

Figures 3, 4:
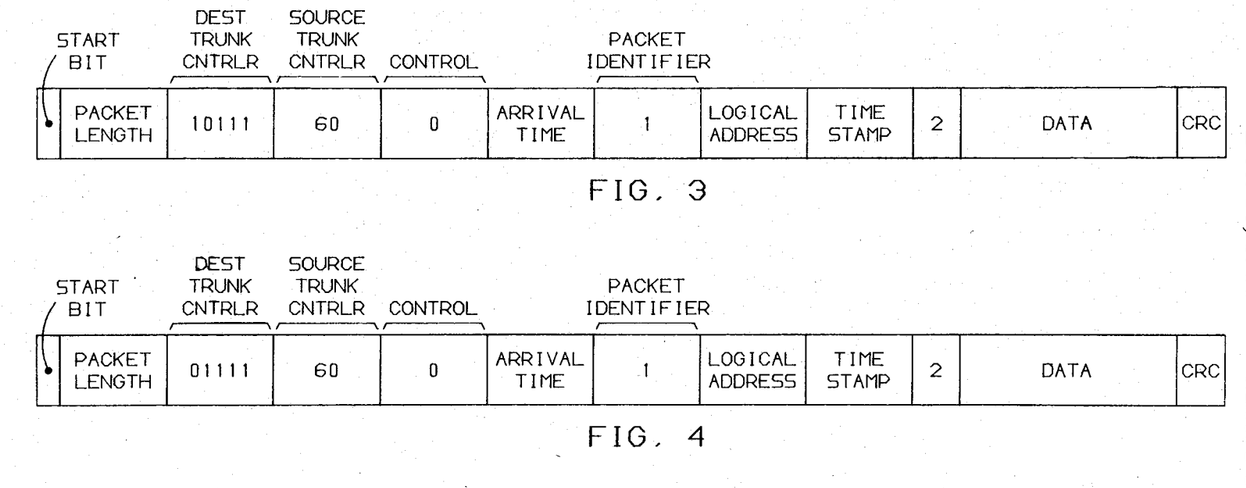
FIGS. 3 through 6 illustrate the contents of a packet as it is transmitted from trunk controller 104 to trunk controller 107 through packet switching network 101.

Switch node 201-3 is responsive to the packet illustrated in FIG. 4 received via link 204 to communicate this packet via link 205 to node 202-2. Switch node 201-3 selects either sublink 205-0 or sublink 205-1 depending on which link is idle. The communication of the packet illustrated in FIG. 4 from switch node 201-3 to switch node 202-2 via link 205 is subject to the following condition. If a packet previously received via link 204 is pending transmission via link 205 to switch node 202-2 switch node 201-3 restricts the communication of the packet illustrated in FIG. 4 until communication of the previously received packet has started. After communication of the previously received packet has begun, switch node 201-3 commences to transmit the packet illustrated in FIG. 4 to switch node 202-2 after performing a left rotation of the destination trunk controller field resulting in the packet illustrated in FIG. 5. By performing the previous operation, switch node 201-3 assures that packets received on link 204 destined for link 205 do not get out of sequence since a packet received on link 204 destined for link 205 must await transmission until previously received packets from link 204 to link 205 have been transmitted.

Figure 5:
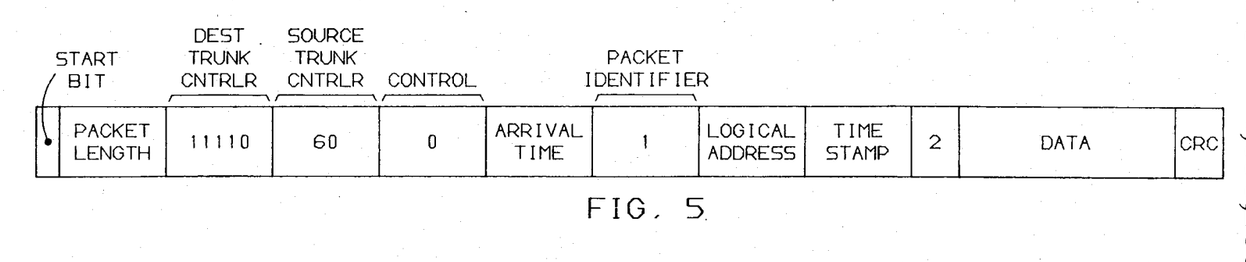
Figure 6:
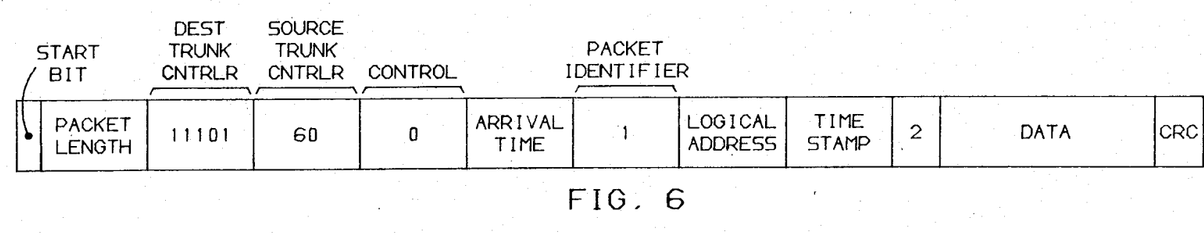

Switch node 202-2 is responsive to the packet illustrated in FIG. 5 to perform the same sequence check and to left rotate the destination trunk controller field before transmitting the packet as illustrated in FIG. 6 to switch node 203-2. Switch node 203-2 is responsive to the two most significant bits of the packet illustrated in FIG. 6 to communicate the packet to trunk controller 107 via conductor 120.

Figure 7:
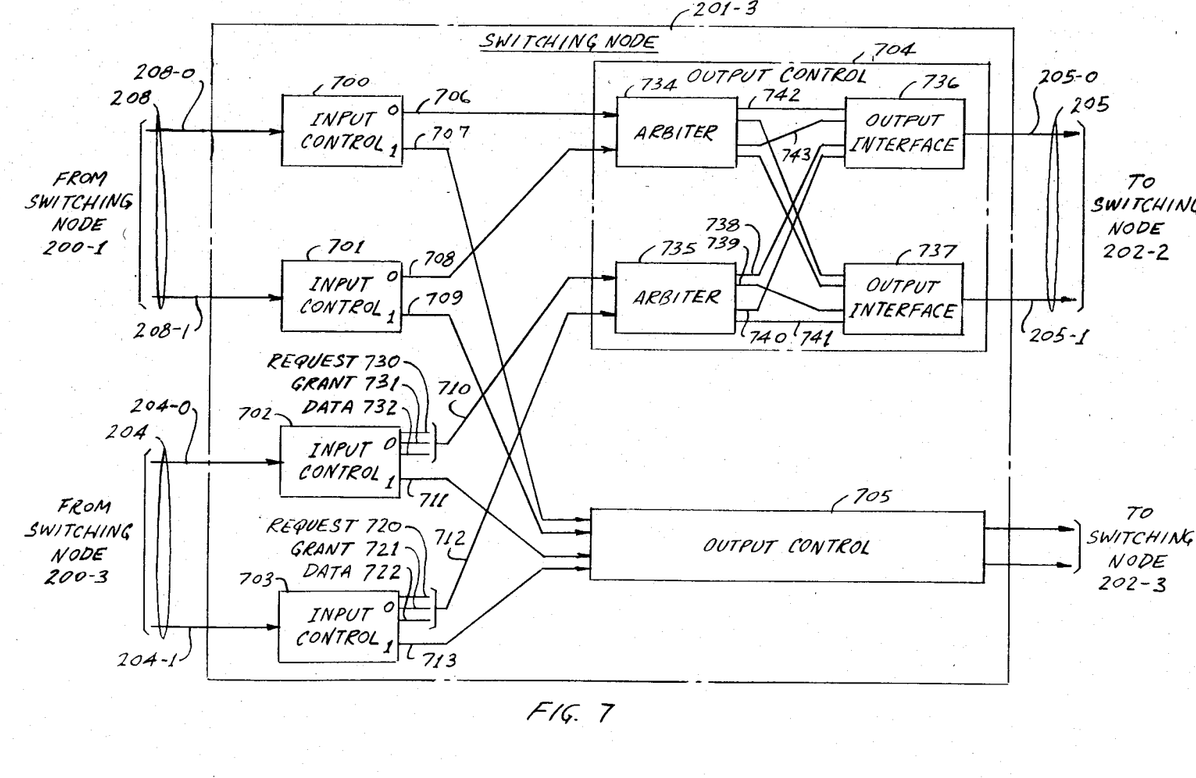
FIG. 7 is a detailed block diagram of switch node 201-3 of FIG. 2.

Switch node 201-3 is illustrated in greater detail in FIG. 7. The four sublinks on which switch node 201-3 receives packets are individually terminated on input control circuits. For example, sublink 204-1 is terminated on input control 703. Input controls 700 through 703 are identical in design. Each outgoing link from switch node 201-3 is terminated by an output control circuit. For example, output control 704 terminates link 205 that comprises sublinks 205-0 and 205-1. Output control 705 is identical in design to output control 704. Packets are transferred between input and output controls via cables 706 through 713. Each incoming link terminates a pair of input control circuits with each pair being connected to an arbiter circuit in each output control circuit. The arbiter circuits determine the sequencing of packets.

For example, input controls 702 and 703 interface link 204 to switch node 201-3. Those input controls are interconnected to output control 704 via cables 710 and 712 which connect to arbiter 735. Arbiter 734 and 735 determine when an input control pair can transfer data to the output control 704, and output interfaces 736 and 737 determine when switch node 202-2 which is connected to link 205 is capable of accepting another packet. Consider the example of transferring the packet illustrated in FIG. 4 from switch node 201-3 to switch node 202-2. Assume that the packet illustrated in FIG. 4 was communicated to switch node 201-3 via sublink 204-1. Upon receipt of the packet illustrated in FIG. 4, input control 703 transmits a request signal via cable 712 to arbiter 735. If arbiter 735 does not have a request from input control 702 via cable 710 pending, arbiter 735 processes the request from input control 703. A request is considered pending if the input control has transmitted to the arbiter circuit a request and the arbiter circuit has not yet responded with a grant signal. The latter signal informs the input control that it can commence transferring the packet to the output control. If arbiter 735 does not have a request pending from input control 702, it relays the request from input control 703 to output interfaces 736 and 737 via cables 740 and 741, respectively. Until output interfaces 736 or 737 respond with a grant signal, arbiter 735 does not relay any request signal from input 702 to those output interfaces. Once, one of the output interfaces responds with a grant signal, arbiter 735 relays this grant signal back to input control 703 which commences to transfer the packet illustrated in FIG. 5 having left rotated the packet of FIG. 4 before transfer. Arbiter 735 is responsive to the data received from input control 703 via cable 712 to steer this data to the output interface that responded with the grant signal.

Figure 8:
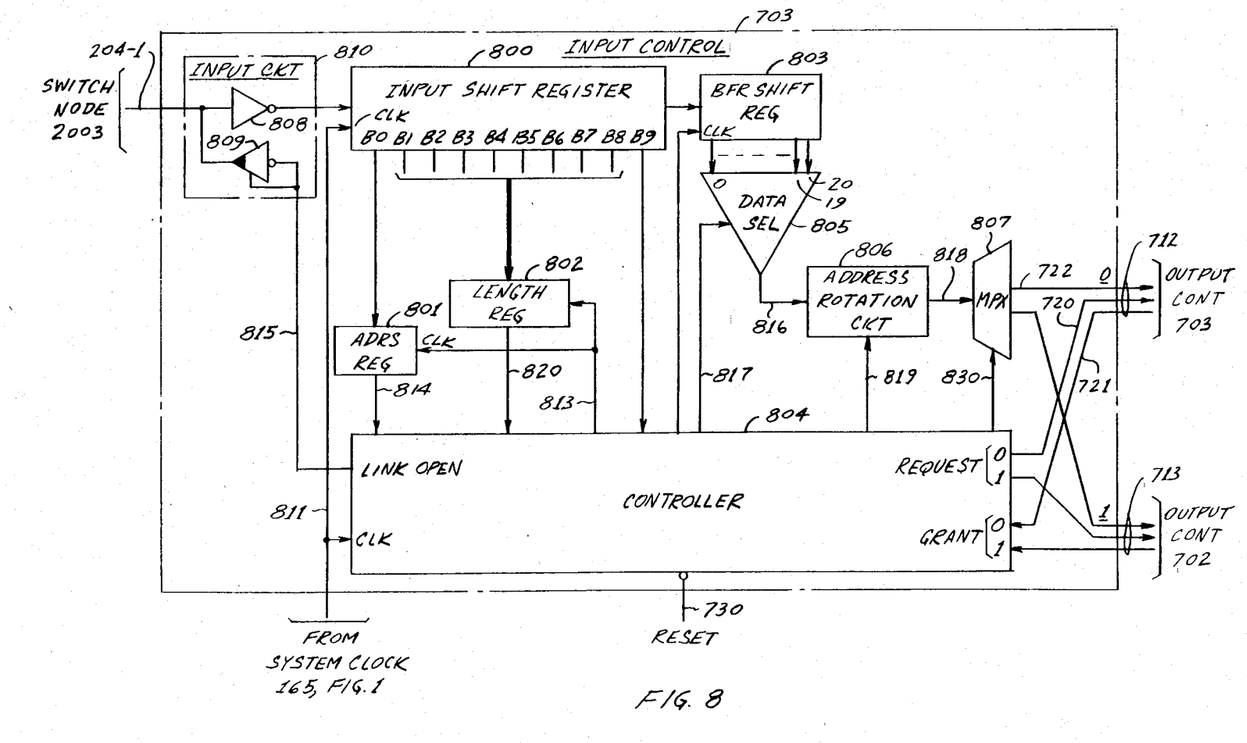
FIG. 8 is a detailed block diagram of input control 703 of switch node 201-3 of FIG. 7.

Input control 703 is illustrated in greater detail in FIG. 8. Input circuit 810 receives the information from switch node 200-3 via sublink 204-1. The link-open signal is under control of controller 804. The function of the link-open signal is explained in greater detail with respect to the discussion of FIG. 10. Input shift register 800 is used to detect the start bit that indicates the beginning of the packet. In addition, shift register 800 is used to extract the network packet length field, which is saved in length register 802 and the most significant bit of the destination trunk controller field which is saved in address register 801.

Buffer shift register 803 is capable of buffering one complete packet. Buffer shift register 803 provides an output after each 64 bits of storage. These outputs are selected by data selector 805 under control of controller 804, to bypass unused portions of the buffer shift register 803. This bypassing is done when it is not necessary to buffer a whole packet before the transmission of a packet can start to the output circuit and is done to speed up the transfer of the packet. Address rotation circuit 806 is used to perform the left rotation of the destination trunk controller field. Multiplexer 807 is utilized to properly steer the data from the output of address rotation circuit 806 to the appropriate output circuit.

The operation of input control 703 will now be further explained by using the previous example which dealt with the transmission of the packet shown in FIG. 4. Input shift register 800 is continuously being clocked by the system clock 165 via conductor 811. As data is received via sublink 204-1, it is clocked through input shift register 800. Once the start bit reaches bit position 9 of input register 800, controller 804 detects this bit and transmits a signal via conductor 813. The most significant bit of the trunk controller destination field and the length field are stored in address register 801 and length register 802, respectively, in response to the transmission of the signal on conductor 813. Since the most significant bit is a "0", controller 804 is responsive to this fact to transmit a request to output control 704 via conductor 720 of cable 712. While this request is being made, data is being shifted from input shift register 800 to buffer shift register 803 that has a number of output terminals. These output terminals are connected to different bit positions within buffer shift register 803. When controller 804 has received the grant signal from output control 704 via conductor 721 of cable 712, controller 804 calculates at which output of the buffer shift register 803, the start bit of the packet is approaching within buffer shift register 803. This is done so that the transmission of the packet to the output controller can start as soon as possible. On the basis of this calculation, controller 804 controls data selector 805 to select the designated output of buffer shift register 803. The control information is transmitted to data selector 805 via cable 817. Data selector 805 transmits the data from the selected output of buffer shift register 803 to address rotation circuit 806 which performs the address rotation and transfers the information to multiplexor 807. Controller 804 conditions multiplexer 807 via cable 830 to transmit the information received from rotation circuit 806 via conductor 722 of cable 712 to output control 704. Once, the entire packet has been transmitted to output control 704, controller 804 having determined this by the contents of the length register transmits the open-link signal via conductor 815 and input circuit 810 to switch node 200-3 via sublink 204-1 informing switch node 200-3 that input control 703 has the capacity to receive another packet via sublink 204-1.

Figure 9:
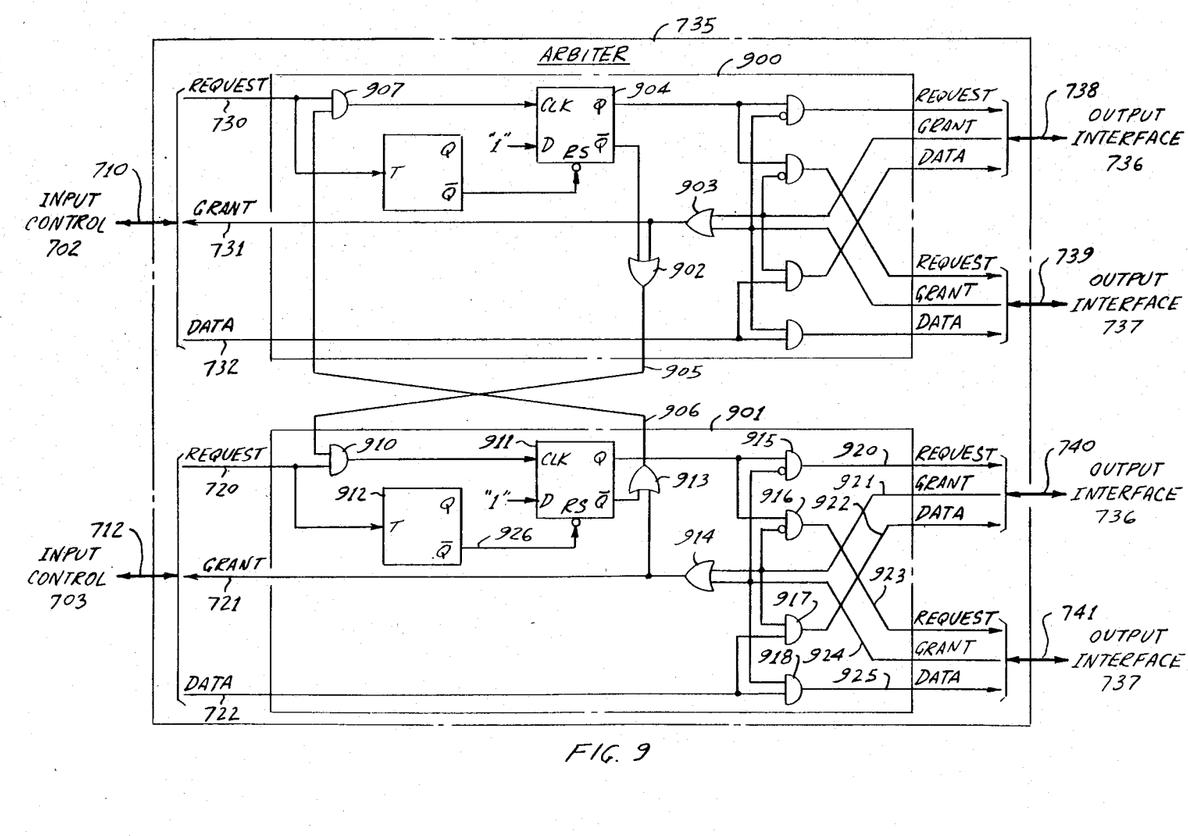
FIG. 9 is a detailed block diagram of arbiter 735 of output control 704 of FIG. 7.

Arbiter 735 is illustrated in greater detail in FIG. 9. Arbiter 735 comprises subcircuits 900 and 901. Subcircuit 900 interfaces cable 710 from input control 702 to arbiter 735, and subcircuit 901 interfaces cable 712 from input control 703 to arbiter 735. The following description will describe in detail the operation of subcircuit 901; however, subcircuit 900 is similar in operation. Elements 910 through 912 and elements 915 and 916 are used by subcircuit 901 to relay a request signal received on conductor 720 from input control 703 to output interfaces 736 and 737 unless subcircuit 900 has a request pending to those two output interfaces. A grant signal from either of those output interfaces is relayed back to input control 703 by gate 914 via conductor 721. When input control 703 in response to the grant signal commences transmission of data to arbiter 735 via conductor 722, this data is steered to the output interface that transmitted the grant signal to subcircuit 901 by gate 917 or 918.

Consider now, the operation of subcircuit 901 in greater detail with reference to the communication of the packet illustrated in FIG. 4 from switch node 201-3 to switch node 202-2 via subcable 205-0. First, consider the transfer of the packet when subcircuit 900 does not have a request pending to the output interfaces. Upon receiving the packet illustrated in FIG. 4, input control 703 decodes the most significant bit of the destination trunk controller field and transmits a request to subcircuit 901 via conductor 720 as was discussed in the previous description of FIG. 8. Since subcircuit 900 does not have a request pending, the output of gate 902 transmitted via conductor 905 is a "1". The conditions controlling the output of gate 902 by flip-flop 904 and gate 903 will be discussed later with respect to the corresponding elements in subcircuit 901. AND gate 910 is responsive to the request signal received via conductor 720 and the "1" received via conductor 905 to transmit a signal to the clock input of flip flop 911 which causes this flip flop to store a "1". Next, the request stored in flip flop 911 is relayed to output interfaces 736 and 737 by AND gates 915 and 916, respectively. Since subcircuit 901 now has a request pending to output interfaces 736 and 737, it is necessary to inhibit subcircuit 900 from also transmitting a request to that output circuit. This inhibiting is done by OR gate 913 transmitting a "0" to AND gate 907. This disables AND gate 907 from transferring requests received via conductor 730 to flip-flop 904 thus inhibiting any requests being made by subcircuit 900. The output of OR gate 913 is conditioned by the output of flip-flops 911 and 914 which, at this point in time, have the following conditions. Since a grant signal is not being received from either of the interface circuits via conductors 921 or 924, the output of OR gate 914 is a "0". In addition, the input to OR gate 913 from flip-flop 911 is a "0". These two inputs to OR gate 913 cause OR gate 913 to transmit via conductor 906, a "0" to AND gate 907 which disables requests to flip-flop 904.

Now that flip-flop 911 is set, indicating a request from input control 703, this request is relayed to output interfaces 736 and 737 via AND gates 915 and 916, respectively, over the appropriate conductors. Assume that output interface 736 responds to the request signal received via conductor 920 with a grant signal on conductor 921. In response to the grant signal on conductor 921, AND gate 916 removes the request to output interface 737 from conductor 923. Also, in response to the grant signal on conductor 721, OR gate 914 transmits the grant signal back to input control 703 so that the latter control can commence transmission of data via conductor 722. Upon receipt of the data via conductor 722, this data is steered to output interface 736 via conductor 922 by AND gate 917 responding to the grant signal on conductor 921.

Now that the request from subcircuit 901 is no longer pending to the output interfaces, subcircuit 900 must be enabled to respond to requests received from input control 702 via conductor 730. This enabling is done by OR gate 913 responding to the grant signal on conductor 921 by transmitting a "1" to AND gate 907 via conductor 906. The receipt of a "1" on conductor 906 enables AND gate 907 to respond to a request on conductor 730 by setting flip-flop 904 resulting in subcircuit 900 making requests to the output interfaces in the same manner as previously described for subcircuit 901.

Once input control 703 has finished transmitting the packet to arbiter 735, it removes the request signal being transmitted via conductor 720. The removal of the request signal from conductor 720 causes monostable 912 to transmit a short pulse via conductor 926 to the reset input of flip-flop 911. Flip-flop 911 is responsive to this pulse on its reset input to store a "0" which results in a "1" being transmitted to OR gate 913. In response to the "1" received from flip-flop 911, OR gate 913 transmits a "1" to AND gate 907 via conductor 906 thus enabling subcircuit 900 to respond to requests received via conductor 730 by setting flip-flop 904. In addition, the resetting of flip-flop 911 causes the request signal transmitted via conductor 920 and AND gate 915 to be removed. Output interface 736 is responsive to the removal of the request signal to cease transmitting the grant signal via conductor 921 to subcircuit 901.

Next, consider the case where subcircuit 900 has a request pending to the output interfaces when the request was received from input control 703 by subcircuit 901. Since AND gate 910 is disabled from transmitting the request to flip-flop 911 by the presence of a "0" conducted via conductor 905 from OR gate 902 (since subcircuit 900 has a request pending), the request received via conductor 720 has no effect on subcircuit 901. Once the request is no longer pending for subcircuit 900, OR gate 902 transmits a "1" to AND gate 910 via conductor 905. In response to the output of OR gate 902, AND gate 910 relays the request pending on conductor 720 to the clock input of flip-flop 911 resulting in this flip-flop being set. The setting of flip-flop 911 causes the appropriate request to be made to the output interfaces as previously described.

Figure 10:
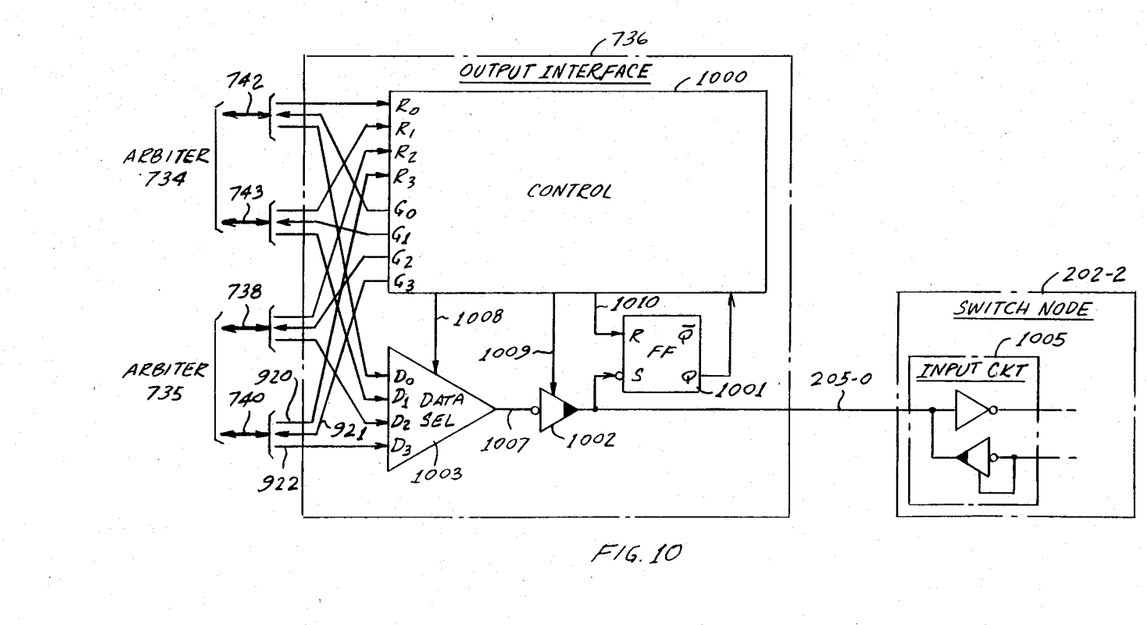
FIG. 10 is a detailed block diagram of output interface 736 of switch node 201-3 of FIG. 7.

Output interface 736 is shown in greater detail in FIG. 10. Control circuit 1000 responds to requests from arbiters 734 and 735, which are transmitted via cables 738, 740, 742, and 743. If flip-flop 1001 is set, control circuit 1000 responds to the request by transmitting a grant signal back to the requesting arbiter via one of the above-mentioned cables. After acknowledging the request, control circuit 1000 conditions data selector 1003 to select the data conductor from the appropriate cable. Control circuit 1000 transmits the appropriate control information to data selector 1003 via cable 1008. Data selector 1003 transfers the data information received on the selected input terminal to conductor 1007. Tri-state device 1002 takes the information on conductor 1007 and transmits this data via sublink 205-0 to input circuit 1005, which is part of switch node 202-2. Control circuit 1000 controls the output of tri-state device 1002 via conductor 1009. A more detailed description of output interface 736 can be found in the previously mentioned U.S. Pat. No. 4,494,230. A similar circuit is described in that patent but is referred to as output control 1007.

It is to be understood that the above-described embodiment is merely illustrative of the principles of the invention and that other arrangements may be devised by those skilled in the art without departing from the spirit and the scope of the invention.

What is claimed is:

1. A self-routing packet switching network for communicating packets each comprising address routing information from network input ports to network output ports, said network comprising:
   a plurality of switching stages;
   a plurality of inter-stage links interconnecting said stages;
   each of said inter-stage links comprising a plurality of sublinks;
   each of said stages comprising a plurality of switch nodes;
   one of said switch nodes responsive to one of said packets received via an upstream one of said links for communicating one of said packets to the downstream stage via one of said sublinks of a downstream one of said links designated by said address routing information contained within said one of said packets; and
   said one of said switch nodes comprises means responsive to a later one of said packets from said upstream one of said links and said later one of said packets' routing information designating said one of said downstream links for sequencing said later one of said packets via said downstream one of said links so that said one of said packets arrives at the downstream node connected to said downstream one of said links before said later one of said packets.

2. The self-routing packet switching network of claim 1 wherein said one of said nodes comprises:
   a plurality of input means each individually connectable to the sublinks connected to said one of said switch nodes;
   a plurality of output means each individually connectable to one of the subset of said downstream links connected to said one of said switch nodes;
   intra-links individually connecting said input means to each of said output means;
   one of said input means responsive to said one of said packets for transmitting a first request signal via one of said intra-links to one of said output means connected to said one of said downstream links requesting the communication of said one of said packets on said one of downstream links;
   another one of said input means responsive to said later one of said packets for transmitting a second request signal to said one of said output means requesting the transfer of said later one of said packets on said one of said downstream links; and
   said one of said output means comprises means connected to the intra-links from said plurality of said input means and responsive to said request signals for arbitering the communication said one of said packets to said downstream link prior to the transfer of said later one of said packets on said downstream link.

3. The network of claim 2 wherein the arbiter means further comprises means for transmitting to said requesting input means grant signals upon said one of said output means being able to transmit ones of said packets on said downstream link in said proper sequence.

4. The network of claim 3 wherein each of said input means comprises means for buffering the received packet; and
   means for commencing the communication of said stored packet upon receipt of the grant signal.

5. The network of claim 4 wherein said one of said output means further comprises a plurality of means for output interfacing said one of said output means with an individual one of said sublinks of said one of said downstream links;
   said arbiter means comprises means for individually input interfacing said one and said other one of said input means to said arbiter;
   each of the input interfacing means connected to each of the output interfacing means; and
   one of said input interface means responsive to said first request signal from said one of said input means for relaying said first request signal to each of said output interface means upon the absence of said second request signal from another one of said input interface means.

6. The network of claim 5 wherein one of said output interface means responsive to the relayed first request signal for transmitting one of said grant signals to said one of said input interface means; and
 said one of said input interface means responsive to said one of said grant signals for relaying the latter to said one of said input means.

7. The network of claim 6 wherein said one of said input interface means comprises means responsive to said one of said grant signals for disabling other ones of said input interface means from relaying request signals.

8. The network of claim 7 wherein said disabling means comprises:
 a flip-flop responsive to said first request signal from said one of said input means to store a one;
 means responsive to said one stored in said flip-flop for disabling other ones of said input interface means; and
 means responsive to the absence of said first request signal from said one of said input means for resetting said flip-flop so that the latter stores a zero.

9. The network of claim 8 wherein said one of said input interface means further comprises means responsive to the communication of said one of said packets from said input means for steering said one of said packets to said one of said output interface means responding with said one of said grant signals.

10. A self-routing packet switching network for communicating packets each comprising address routing information from network input ports to network output ports, said network comprising:
 a plurality of switching stages;
 a plurality of inter-node links interconnecting said stages;
 each of said inter-node links comprising a pair of sublinks;
 each of said stages comprising a plurality of switching nodes;
 each of said switch nodes comprising a plurality of intra-node links;
 a plurality of input means and output means interconnected by said intra-node links;
 a pair of said input means each individually connected to one of the sublinks of one of said inter-node links;
 said pair of said input means interconnected to one of said output means via a pair of intra-node links;
 one of said pair of said input means responsive to one of said packets received via one of said sublinks for transmitting a request signal to said one of said output means;
 another one of said pair of said input means responsive to another one of said packets received on the other one of said pair of sublinks for transmitting another request signal to said one of said output means; and
 said one of said output means responsive to the request signals for communicating said one of said packets via one of the sublinks of the downstream inter-node link prior to the communication of said other one of said packets on said downstream inter-node link.

11. The network of claim 10 wherein said one of said output means comprises means for sequencing the request signals received from said pair of input means; and
 means for generating a grant signal for transmission to said one of said pair of said input means to allow communication of said one of said packets upon the attached downstream inter-node link having capacity to communicate a packet.

12. The network of claim 11 wherein said sequencing means comprises first means responsive to said request signal for transferring said request signal to said generating means; and
 second means responsive to said other request signal for transferring said other request signal to said generating means upon said generating means generating said grant signal in response to said request signal.

13. The network of claim 12 wherein said first means comprises means responsive to said request signal to transmit a signal to said second means for disabling said second means from transferring said other request signal to said generating means in the absence of said grant signal.

14. The network of claim 13 wherein said disabling means comprises a flip-flop responsive to said request signal for storing a one;
 and responsive to the absence of said request signal for storing a zero; and
 said second means comprising means responsive to the stored one in said flip-flop for disabling the transfer of said other request signal in the absence of said grant signal.

15. A self-routing packet switching network for communicating packets each comprising address routing information from network input ports to network output ports, said network comprising:
 a plurality of switching stages;
 a plurality of inter-node links interconnecting said stages;
 each of said inter-node links comprising a pair of sublinks;
 each of said stages comprising a plurality of switch nodes;
 each of said switch nodes comprising a plurality of intra-node links;
 a plurality of input means and output means interconnected by said intra-node links;
 a pair of said input means each individually connected to one of the upstream sublinks of one of said upstream inter-node links;
 said pair of said input means interconnected to one of said output means via a pair of intra-node links;
 one of said pair of said input means comprising means responsive to one of said packets received via one of said upstream sublinks for transmitting a first request signal to said one of said output means via one of said pair of said intra-node links;
 another one of said pair of said input means comprising means responsive to later one of said packets received on the other one of said pair of said upstream sublinks for transmitting a second request signal to said one of said output means via another one of said pair of said intra-node links;
 said one of said output means comprises a first flip-flop for storing the first request signal received via one of said pair of intra-node links;
 a second flip-flop connected to the other one of said pair of inter-node links;
 logic means responsive to the storing of said request signal by said first flip-flop for disabling said second flip-flop from storing said second request signal;
 output interface means responsive to the storing of said first request signal by said first flip-flop for transmitting a first grant signal to said one of said input means via said one of said pair of intra-node links;

said one of said input means comprises means responsive to said first grant signal for commencing the transfer of said one of said packet to said output interface means via said one of said pair of said intranode links;

said one of said output means further comprises logic means responsive to said transmission of said first grant signal for enabling the storing of said second request signal by said second flip-flop;

said output interface means comprises means responsive to the storing of said second request signal by said second flip-flop for generating a second grant signal for transmission to said other one of said input means via said other one of said pair of said intra-node links; and said other one of said input means comprises means responsive to said second grant signal for commencing the transfer of said later one of said packets to said output interface means via said other one of said pair of said intra-node links.

16. A method of switching packets by a switching network having switching stages each comprising a plurality of switching nodes and each of said packets having routing information and the stages being interconnected by a plurality of inter-stage links each comprising a plurality of sublinks, comprising the steps of:

communicating one of said packets received from an upstream one of said links to a downstream stage via one of said sublinks of a downstream one of said links designated by the address routing information contained within said one of said packets by one of said switch nodes; and sequencing a later one of said packets from said upstream link upon said later one of said packets' routing information designating said downstream link via said downstream one of said links so that said one of said packets arrives at the downstream node connected to said downstream one of said links before said later one of said packets.

17. The method of claim 16 wherein said one of said switch nodes comprises a plurality of input means each individually connectable to the upstream sublinks connected to said one of said switch nodes and a plurality of output means each individually connectable to one of said downstream links connected to said one of said nodes and intra-links individually connecting said input means to each of said output means and the output means connected to said one of said downstream link having an arbiter means connected to the intra-links from said plurality of said input means, said communicating step comprises the step of transmitting a first request signal via one of said intra-links by said one of said input means to said arbiter means requesting the communication of said one of said packets on said one of said downstream links;

said sequencing step comprises the step of transmitting a second request signal by another one of said input means in response to said later one of said packets to said arbiter means requesting the transfer of said later one of said packets on said one of said downstream links;

said method further comprises the step of generating a grant signal in response to said first request signal by said one of said output means for transmission to said one of said input means; and generating another grant signal in response to said second request signal and said grant signal by said one of said output means for transmission to other one of said input means.

* * * * *